USOO5485926A

United States Patent [19]
Kundert

[11] Patent Number: 5,485,926
[45] Date of Patent: Jan. 23, 1996

[54] STORAGE AND DISPLAY HOLDER

[75] Inventor: James W. Kundert, Sudbury, Mass.

[73] Assignee: Andrew G. Dimock, Dallas, Tex.

[21] Appl. No.: 234,185

[22] Filed: Apr. 28, 1994

[51] Int. Cl.$^6$ ............................................. A47F 7/00
[52] U.S. Cl. ............................ 211/40; 211/94; 312/9.9; 206/309
[58] Field of Search ........................... 211/40, 41, 87, 211/88, 94; 312/9.9; 206/309, 387

[56] References Cited

U.S. PATENT DOCUMENTS

| | | | |
|---|---|---|---|
| 2,576,983 | 12/1951 | Walker | 40/140 |
| 3,296,724 | 1/1967 | Deuchar | 40/10 |
| 3,337,059 | 8/1967 | Le Hoy | 211/86 |
| 3,464,748 | 9/1969 | Gregory | 312/216 |
| 3,805,962 | 4/1974 | Bendiksen | 211/4 |
| 3,908,830 | 9/1975 | Skrzelowski | 211/55 |
| 4,132,311 | 1/1979 | Glinert | 206/387 |
| 4,232,790 | 11/1980 | Serrano | 211/40 |
| 4,254,880 | 3/1981 | Mangel | 211/41 |
| 4,257,524 | 3/1981 | Yonkers et al. | 211/71 |
| 4,290,530 | 9/1981 | Wooster | 211/40 |
| 4,350,252 | 9/1982 | Hopkins et al. | 211/40 |
| 4,497,125 | 2/1985 | Hutchinson | 40/10 |
| 4,645,075 | 2/1987 | Van der Lely | 206/387 |
| 4,691,826 | 9/1987 | Ozeki | 206/456 |
| 4,715,669 | 12/1987 | Baillie et al. | 312/12 |
| 4,785,578 | 11/1988 | Grene | 47/86 |
| 4,867,306 | 9/1989 | Factor | 206/309 |
| 4,919,287 | 4/1990 | Haskett et al. | 211/41 |
| 4,940,147 | 7/1990 | Hunt | 211/40 |
| 5,040,687 | 8/1991 | Whittington | 211/40 |
| 5,052,564 | 10/1991 | Zuzack | 211/40 |
| 5,072,836 | 12/1991 | Gross | 211/40 |
| 5,105,952 | 4/1992 | Krattiger | 211/41 |
| 5,148,925 | 9/1992 | Althoff et al. | 211/94 X |
| 5,232,089 | 8/1993 | Kim | 211/41 X |
| 5,259,517 | 11/1993 | Pancoe | 211/41 |
| 5,372,263 | 12/1994 | Niekel | 211/41 |

Primary Examiner—Robert W. Gibson, Jr.
Attorney, Agent, or Firm—Richards, Medlock & Andrews

[57] ABSTRACT

A storage and display unit for organizing a plurality of articles having a substantially uniform height, a substantially uniform width and a substantially uniform thickness, comprises at least one pair of horizontal members, each horizontal member having a flange extending toward the other horizontal member of the pair to define therebetween an opening which has a vertical height less than the vertical height of an article, a horizontal width greater than twice the horizontal width of an article. The storage area behind the flanges has a depth greater than twice the thickness of an article.

17 Claims, 3 Drawing Sheets

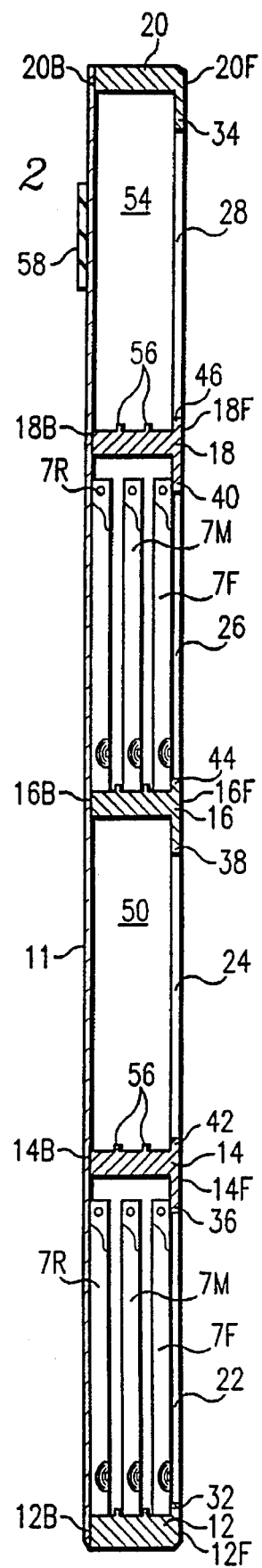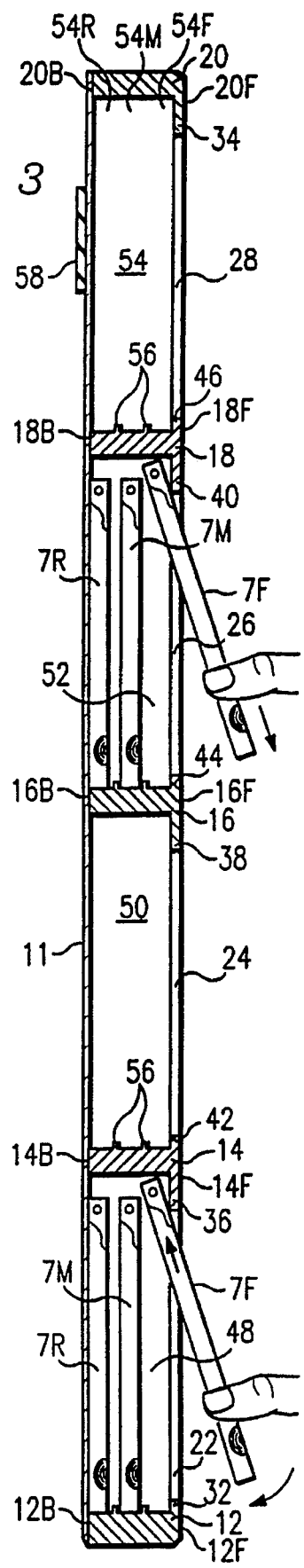

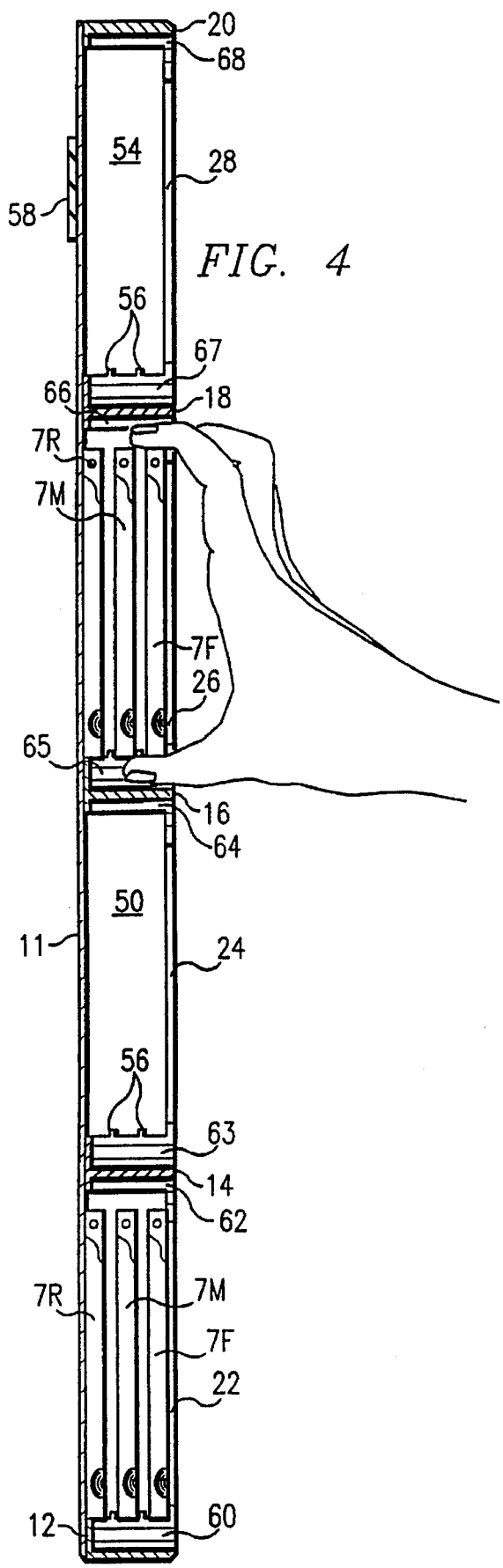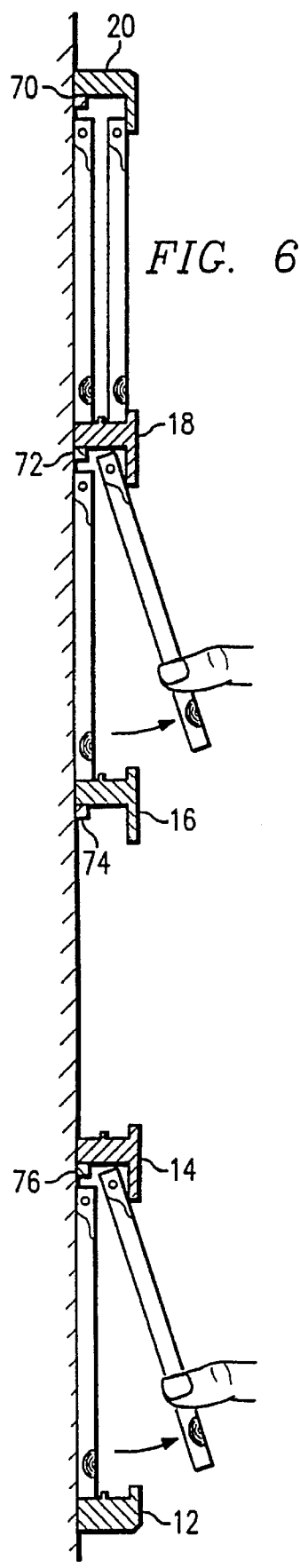

STORAGE AND DISPLAY HOLDER

TECHNICAL FIELD OF THE INVENTION

This invention relates to a storage and display unit, and in particular to a device for providing a space efficient and visually pleasing storage for a plurality of articles having a substantially uniform height, a substantially uniform width and a substantially uniform thickness.

BACKGROUND OF THE INVENTION

Historically, popular audio entertainment media have included phonograph records, eight-track tape cartridges and audio cassettes. Recently, consumer items such as compact discs (CDs) have emerged as an alternative to the traditional media. Since the consumer or retailer may well have many such items, storage has become a significant problem. Particularly, the owner of such items needs a compact method of storage that can keep the items well organized for prompt identification and easy access.

In this context, the jackets or the shell containers for the items usually have interesting artworks on the front thereof to provide aesthetic representations of the items for promotional purposes. Since the relatively large visual image on the front of the jacket or shell container is more easily recognized than the relatively small words on the edge of the jacket or container, the task of identifying a particular item from a number of items could be accelerated considerably if the storage system allows for an inspection of the front face of the jacket or the shell container for such items. Further, a collage of these aesthetic designs has been found to be attractive as an artwork that can enhance the overall entertainment process. Thus, a need exists for a storage system with the ability to: (1) store items in a space efficient manner, (2) provide quick and easy access to the items, and (3) display the shell covers.

Numerous racks have been provided in the prior art that are adapted to display various items. For example, U.S. Pat. No. 4,867,306 to Factor, U.S. Pat. No. 4,350,252 to Hopkins, U.S. Pat. No. 4,290,530 to Wooster, U.S. Pat. No. 4,919,287 to Haskett et al., U.S. Pat. No. 4,940,147 to Hunt and U.S. Pat. No. 3,805,962 to Bendiksen are illustrative of such prior art. Factor discloses a rack assembly having axially spaced ledges positioned such that the compact disc container is gripped in the rack assembly. Hopkins discloses a storage rack mountable to a support for receiving and fully displaying individual thin rectangular articles such as record albums. Wooster discloses a frame for storing and displaying a single set of record albums, stacked one behind the other, that can be slid partially off the frame to reveal record albums therebehind. Haskett discloses a display unit for storing and displaying the artwork of compact disks having a plurality of parallel horizontal rails. Hunt discloses a compact disk wall rack for displaying the artwork of compact disks. Bendiksen discloses a display rack having a plurality of horizontal rails wherein a single row of articles can be placed in side-by-side on each horizontal rail. However, while these prior art units display the cover art of the media packages, they do not provide the most efficient storage because of their poor space utilization.

SUMMARY OF THE INVENTION

Accordingly, it is an object of the present invention to provide a device for storing and displaying a plurality of articles.

Another object of the present invention is to provide a device which can be freestanding or wall-mounted for storing and displaying a plurality of articles.

Still another object of the present invention is to provide a device for storing and displaying a plurality of articles that insures the articles will remain stable in the device without the need for attachment of independent fastener means.

A further object of the present invention is to provide a storage and display device which allows essentially all of the surface of the face of the article to be displayed, but yet supports the article in position while permitting ready removal or replacement without damage to the articles.

Yet another object of the present invention is to provide a device four storing and displaying a plurality of articles, with the device being easy and cost effective to manufacture.

Another object of the present invention is to provide a device for storing and displaying a plurality of articles wherein the articles are easy to insert, remove and use.

A further object of the present invention is to provide a device for storing and displaying a plurality of articles which enables the user to arrange said articles to best display the graphics thereon in an interesting and unique manner.

Another object of the present invention is to provide a device for storing and displaying a plurality of articles that insures that the articles are free to move horizontally within the device, but cannot be removed from the device without physical intervention.

Another object of the present invention is to provide a device for storing two or more rows of articles with one row being in front of the other row such that the articles in the front row can be moved laterally to expose one or more articles in the back row.

Still yet another object of the present invention is to provide a wall display device capable of holding a plurality of superimposed rows of compact disc shell containers, so as to provide an increased storage capacity for the compact discs, while providing a decorative scheme for the wall.

The present invention provides a device for displaying and storing a plurality of articles having a substantially uniform height, a substantially uniform width and a substantially uniform thickness in a clearly exhibiting, aesthetic arrangement; wherein the storage and display device has a series of horizontally elongated display members; each member having a first end portion, a second end portion, a back side, and a front side. Each front side has at least one vertically extending flange so that an adjacent pair of members form an opening having a width at least twice the width of an article and a height slightly less than the height of an article while forming a storage space having a height greater than the height of an article, for releasably receiving and retaining the articles in the storage and display unit.

The upper display member in a pair of adjacent display members has a downwardly extending flange spaced from the back side of the upper display member by a distance which is greater than twice the thickness of an article, while the lower display member of that adjacent pair has an upwardly extending flange spaced from the back side of the lower display member by a distance which is greater than twice the thickness of an article. The distance between the downwardly extending flange and the upwardly extending flange of an adjacent pair of members is less than the height of an article, while the distance between at least a portion of the upper display member and the lower display member of the adjacent pair to the rear of the flanges is greater than the height of an article, thereby providing a storage space defined by the flanges and the back side of the pair of display members.

The back sides can be attached to a back panel having a means to mount the device to a vertical surface, such as a wall, and/or vertical members can be attached to the end portions to create a portable frame that can be wall-mounted.

BRIEF DESCRIPTION OF THE DRAWINGS

FIG. 2 is a cross sectional view taken along line 2—2 in FIG. 1 is illustrating the two superimposed rows of articles between an adjacent pair of members, FIG. 3 corresponds to FIG. 2 depicting the insertion of an article in the front row of the first level and the removal of/an article from the front row of the third level, FIG. 4 is a cross sectional view similar to FIG. 2, for a display and storage unit in accordance with a second embodiment of the instant invention, FIG. 6 is a cross sectional view similar to FIG. 2, for a display and storage unit in accordance with a third embodiment of the instant invention.

DETAILED DESCRIPTION OF THE PREFERRED EMBODIMENT

Figure 1:
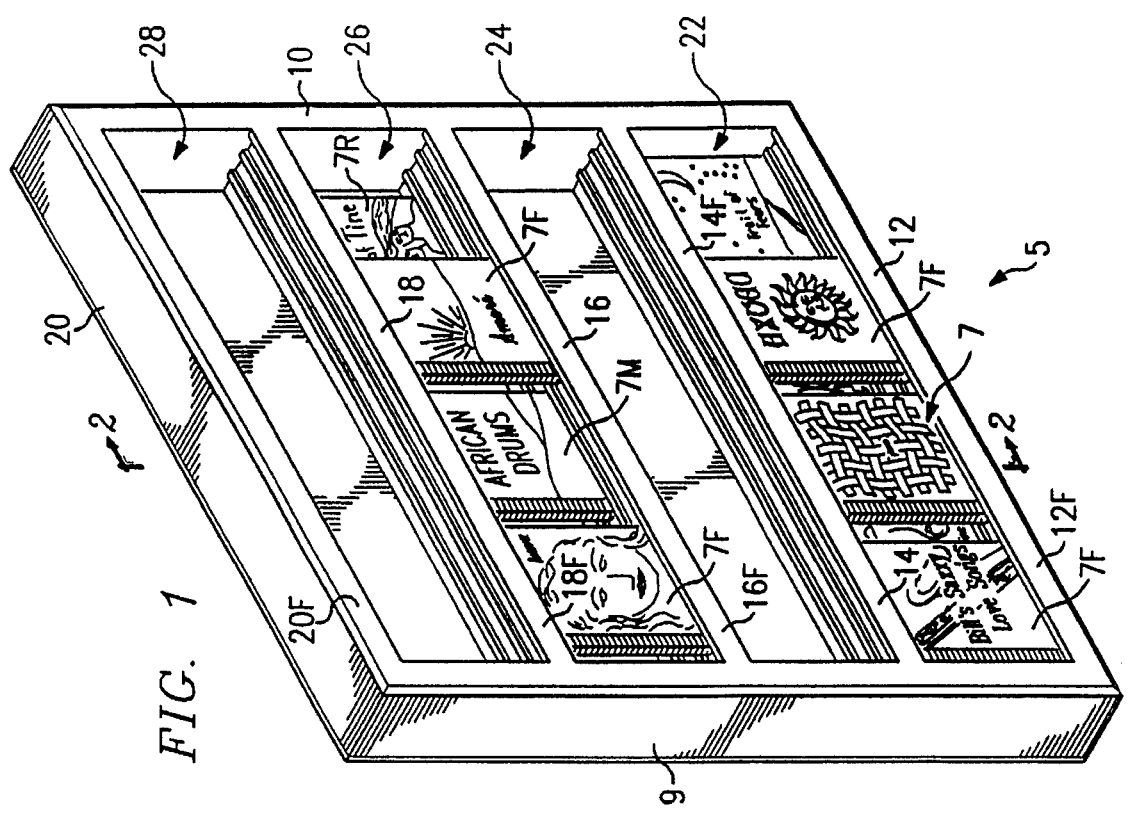
FIG. 1 is a perspective view of a display and storage unit in accordance with a first embodiment of the instant invention.

Referring to FIGS. 1 and 2, the display and storage device 5 for a plurality of articles 7 comprises a frame generally defined by first and second vertical members 9 and 10, a planar back panel 11, and first, second, third, fourth, and fifth horizontally extending members 12, 14, 16, 18, and 20. The frame has four generally rectangular article receiving openings 22, 24, 26, and 28 therewithin. In the illustration, the articles 7 have a substantially uniform height, a substantially uniform width, and a substantially uniform thickness. Each level can contain three superimposed rows of articles 7, with articles 7R being illustrated in the rear row of openings 22 and 26, with articles 7M being illustrated in the middle row of openings 22 and 26, and with articles 7F being illustrated in the front row of openings 22 and 26.

Each of the horizontal members 12, 14, 16, 18, and 20 has first and second end portions at opposite ends thereof, as well as a front side 12F, 14F, 16F, 18F, or 20F, respectively, and a back side 12B, 14B, 16B, 18B, or 20B, respectively. Each of the vertical members 9 and 10 have a back side 9B or 10B, respectively. The vertical member 9 is fixedly secured to the first end portion of each of the horizontal members 12, 14, 16, 18, and 20, while the vertical member 10 is fixedly secured to the second end portion of each of the horizontal members 12, 14, 16, 18, and 20. The back panel 11 is preferably fixedly secured to the back of each of the vertical members 9, 10 and to each of the horizontal members 12, 14, 16, 18, and 20.

Referring to FIG.2, the horizontal member 12 has a vertical flange 32 extending upwardly from the upper surface of the front portion of the horizontal member 12. The horizontal member 20 has a vertical flange 34 extending downwardly from the lower surface of the front portion of the horizontal member 20. Each of the horizontal members 14, 16, and 18 has a vertical flange 36, 38, or 40, respectively, extending downwardly from the lower surface of the front portion of the respective horizontal member, and a vertical flange 42, 44, or 46, respectively, extending upwardly from the upper surface of the front portion of the respective horizontal member. Thus, for each pair of adjacent horizontal members, the lower horizontal member has a flange extending upwardly in a direction toward the upper horizontal member of the pair, and the upper horizontal member has a flange extending downwardly in a direction toward the lower horizontal member of the adjacent pair.

The height of the opening 22 is defined by the distal edges of generally parallel flanges 32 and 36, while the width of the opening 22 is defined by the inner edges of parallel vertical members 9 and 10. The height of the opening 24 is defined by the distal edges of generally parallel flanges 42 and 38, while the width of the opening 24 is defined by the inner edges of parallel vertical members 9 and 10. The height of the opening 26 is defined by the distal edges of generally parallel flanges 44 and 40, while the width of the opening 26 is defined by the inner edges of parallel vertical members 9 and 10. Similarly, the height of the opening 28 is defined by the distal edges of generally parallel flanges 46 and 34, while the width of the opening 28 is defined by the inner edges of parallel vertical members 9 and 10. Each of the openings 22, 24, 26, and 28 has a vertical height which is less than the vertical height of an article 7, a horizontal width which is greater than at least twice the width of an article 7. In the embodiment of FIG. 1, the horizontal width of each opening is slightly greater than four times the width of an article 7 so that each row can contain four articles 7 in a side-by-side relation with a gap between adjacent articles 7 sufficient for a person's fingers to grasp the vertical edges of an article 7 during insertion or removal of an article 7 from the display and storage unit 5.

Each of the flanges 32, 34, 36, 38, 40, 42, 44, and 46 is spaced from the back side of the respective horizontal member and the back panel 11 by a distance which is greater than twice the thickness of an article 7 so that a storage space 48, 50, 52, or 54 is provided between each adjacent pair of horizontal members for containing a plurality of superimposed rows of articles 7 between the two adjacent horizontal members. In the embodiment illustrated in FIG. 2, there is space for three superimposed rows of articles between each pair of horizontal members, with up to four articles 7R in the back row, up to four articles 7M in the middle row, and up to four articles 7F in the front row, such that the storage and display unit 5 can store up to forty eight articles 7.

The articles 7 can be inserted through the respective opening 22, 24, 26, or 28 into the respective storage space 48, 50, 52, or 54 and removed from the respective storage space via the respective opening. Each of the upwardly extending flanges 32, 42, 44, and 46 serves as a retention means for the respective storage space so as to retain articles 7 within the respective storage space until an article is to be removed, while permitting article 7 to be moved laterally within a row having at least one open space for an article 7, thereby permitting the face of each of the articles 7 in the next adjacent row to the rear to be exposed selectively, at least one article at a time. Thus, where the width of a storage space is sufficiently great to hold N number of articles in a row in a side-by-side relationship, limiting each row other than the rearmost row to (N−1) articles permits the face of each of the articles in the storage space to be selectively exposed without the necessity of removing any of the articles from the storage space.

If desired, row separating members or guide rails 56 can be provided on the top surface of each horizontal member other than the top most horizontal member 20, with each row separating member 56 extending upwardly from its horizontal member towards the associated upper horizontal member and extending horizontally parallel to the upwardly extending flange of its horizontal member at a location between adjacent rows within a storage space. Preferably, each row separating member 56 extends from the first end portion of its horizontally extending member to the second end portion of its horizontally extending member in a direction parallel with the back side of its horizontally extending member. The rearmost guide rail 56 is spaced from the back panel 11 a distance greater than the thickness of one of the articles 7. The frontmost guide rail 56 is spaced from the upwardly extending flange by a distance greater than the thickness of one of the articles 7. All guide rails 56 are spaced from any adjacent guide rail 56 by a distance greater than the thickness of one of the articles 7 so as to maintain a spacing therebetween into which an article can be readily inserted or removed. Thus, in the embodiment of FIGS. 1–3, there are two row separating members 56 on each horizontal member 12, 14, 16, and 18, one row separating member 56 being located between the rear row and the middle row and the other row separating member 56 being located between the middle row and the front row. The row separating members 56 are particularly useful in maintaining the articles 7 of a row in a side-by-side relationship.

As each opening 22 24, 26, and 28 has a height which is less than the vertical height of an article 7, it is necessary to incline an article 7 to the vertical during the insertion of the article 7 into a storage space and during the removal of the article 7 from its storage space. As shown in FIG. 3, an article 7F can be inserted through opening 22 into the first level storage space 48 by inclining the article 7F at an acute angle to the vertical so that the top edge of the article 7F is positioned toward the rear of the storage and display unit 5, moving the article 7F toward the rear while in this inclined condition until the top edge of the article 7F has cleared the bottom edge of the downwardly depending flange 36, then raising the article 7F so that the top edge of the article 7F enters the space between the downwardly extending flange 36 and the back panel 11 and pivoting the bottom edge of the article 7F toward the rear of the storage and display unit 5 until the bottom edge of the article 7F has cleared the top edge of the upwardly extending flange 32, and then lowering the article 7F until it rests on the first horizontal member 12 to the rear of the flange 32. The insertion procedure can be the same for the other openings 24, 26, and 28.

Also as shown in FIG. 3, an article 7F can be removed from the third level storage space 52 through opening 26 by raising the article 7F until the bottom edge of the article 7F clears the top edge of the upwardly extending flange 44, pivoting the bottom portion of the article 7F outwardly to incline the article 7F at an acute angle to the vertical to position the top edge of the article 7F rearwardly relative to the bottom edge of the article 7F, lowering the article 7F while in this inclined condition until the top edge of the article 7F has cleared the bottom edge of the downwardly depending flange 40. The removal of an article 7 from the display and storage unit 5 can be also be accomplished by the user applying upward pressure on the face of the article 7 to lift the article 7 until the bottom edge of the article 7 clears the top edge of the upwardly extending flange so that the bottom edge can be grasped by the user for pivoting the bottom edge portion forwardly. The removal procedure can be the same for the other openings 22, 24, and 28.

Also, an article 7R can be removed from the rear row portion 54R of the fourth storage space 54 to the front row portion 54F of the fourth storage space 54 by raising the article 7R until the bottom edge of the article 7R clears the top edge of the rear guide rail 56, pivoting the bottom portion of the article 7R outwardly to incline the article 7R at a slightly acute angle to the vertical to position the top edge of the article 7R pointing in the direction of the planar back panel 11, lowering the article 7R while in this inclined condition until the bottom edge of the article 7R touches the bottom of horizontal member 46 between the front guide rail 56 and the upwardly extending flange 46. The removal of an article 7M from the middle row portion 54M of the fourth storage space 54 can also be accomplished by the user applying upward pressure on the face of the article 7M to lift the article 7M until the bottom edge of the article 7M clears the top edge of the front guide rail 56 so that the bottom edge can be grasped by the user for pivoting the bottom edge portion forwardly. The removal procedure can be the same for moving the articles from the middle row to the front row.

Figure 5:
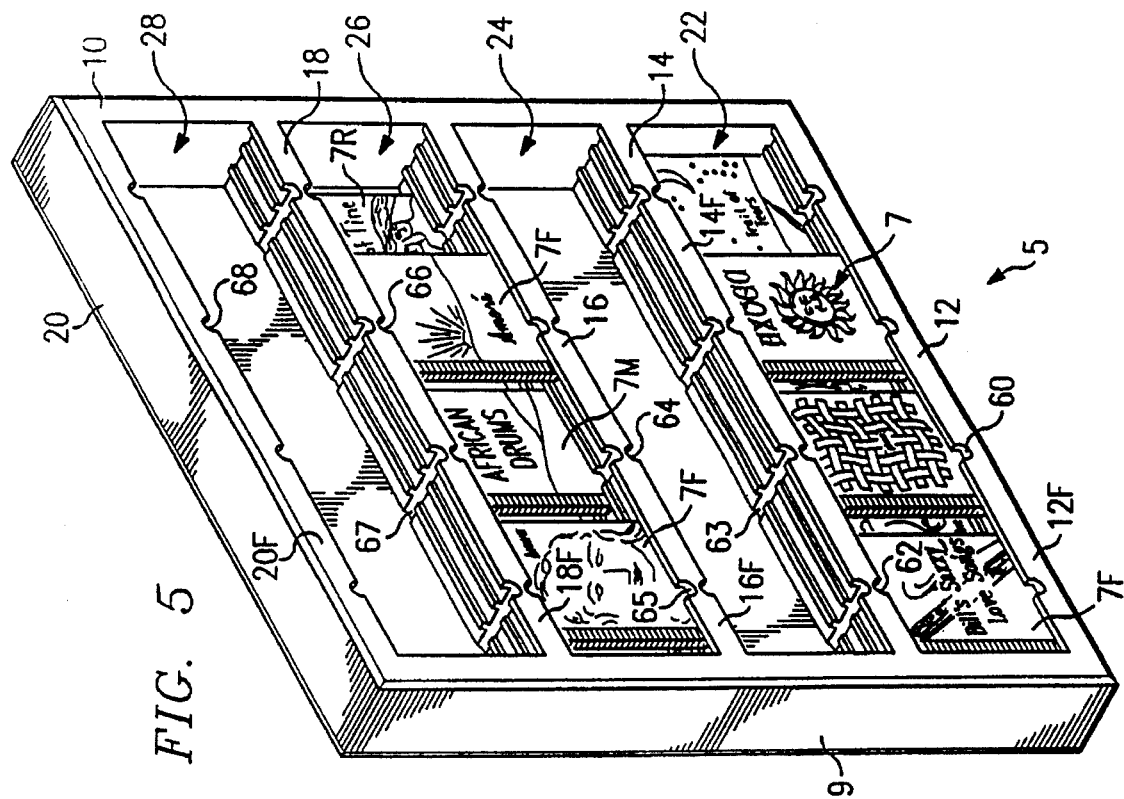
FIG. 5 is a perspective view of a display and storage unit in accordance with the second embodiment of the instant invention.

As shown in FIGS. 4 and 5, the grasping of the top and bottom edges of said article 7 can be facilitated by forming finger notches 60, 62, 63, 64, 65, 66, 67 and 68 in the upwardly extending flanges at one or more positions along the horizontal dimension of the flange. Thus, it is not necessary that the width of the openings 22, 24, 26 and 28 provide gaps of significant width between adjacent articles 7 in a row of articles.

Thus, for each adjacent pair of horizontal members 12, 14, 16, 18, and 20, the horizontal members are spaced apart from each other by a distance which is greater than the sum of the height of an article 7 and the height of the associated upwardly extending flange so as to permit an article 7 to be raised vertically until the bottom edge of the article 7 clears the top edge of the upwardly extending flange, while the confronting edges of the flanges forming the associated opening are spaced apart less than the height of an article 7. It is presently preferred that the distance from the bottom edge of the downwardly depending flange to the top surface of the next lower horizontal member be less than the height of an article 7 so that the article 7 is removably retained within the storage space. The depth or thickness of the horizontal members as measured from the back panel 11 to the inside edge of the flanges is slightly greater than the thickness of an article times the number of rows of compact disc cases being stored in front-to-back relationship in a storage space. Similarly, the width of the horizontal members between first and second vertical members 9 and 10 is slightly wider than the width of the number of articles being stored in side-to-side relationship in a row.

Alternatively each lower horizontal member can have a resilient member (not shown) positioned on the upper surface of the horizontal member for providing an upward force against an article 7 deposited on the resilient member. In such a configuration, the article 7 can be placed in the first storage level 48 in the storage and display unit 5 by inserting the article 7 through the opening 22 at an inclined angle to the vertical with the bottom edge of the article 7 being rearward of the top edge of the article 7 so that the bottom edge portion of the article 7 moves into the space defined by the upwardly extending flange 32 and the back panel member 11. When the top edge of the article 7 clears the downwardly extending flange 36 of the upper horizontal member 14, the article can be pivoted to a vertical position and released, permitting the resilient member to move the article upwardly so that the top edge of the article 7 is above the lower edge of the downwardly extending flange 32, thereby assuring stable retention of the article 7 in the storage and display unit 5. In this situation, the removal of an article 7 simply requires the user to apply a slight downward pressure on the article 7 to compress the resilient member until the top edge of the article 7 is lower than the lower edge of the downwardly extending flange 36. The top portion of the article 7 can then be pivoted outwardly, thus inclining the article 7 to the vertical, and the article can then be removed entirely from the display and storage unit 5.

In this alternate embodiment, for each adjacent pair of horizontal members 12, 14, 16, 18, and 20, the horizontal members are spaced apart from each other by a distance which is greater than the sum of the height of the resilient member in its normal compressed condition, the height of an article 7 and the height of the associated downwardly extending flange 36 so as to permit an article 7 to be moved downwardly vertically until the top edge of the article 7 clears the bottom edge of the downwardly extending flange 36, while the confronting edges of the flanges forming the associated opening are spaced apart less than the height of an article 7. In this alternate embodiment it is presently preferred that the distance from the bottom edge of the downwardly depending flange to the top surface of the resilient member, in its normal article supporting condition, on the next lower horizontal member be less than the height of an article 7 so that the article 7 is removably retained within the storage space.

While the back panel 11 has been described as an integral part of the frame, the back panel 11 can be attached to the frame in any suitable manner, e.g. as a snap-in component, or with screws. The storage and display unit 5 can be fastened to the wall in a room by any conventional fastening means 70, such as pressure sensitive adhesive fasteners or positive fasteners such as screws.

While the storage and display unit 5 has been illustrated in FIGS. 1–5 with only two vertical members 9 and 10, it is possible to employ one or more intermediate vertical members se long as the horizontal spacing between two adjacent vertical members provides an opening having a width greater than the width of N articles 7, N being an integer greater than one and the maximum integer represented by the ratio of the width of the opening to the width of one of the articles 7. While the storage and display unit 5 has been illustrated with five horizontal members any suitable number of horizontal members can be employed.

Referring now to FIG. 6, the storage and display unit 5 in accordance with a third embodiment of the invention, which omits the backing member 11, is formed by fastening one or more of the horizontal members directly to the room wall. As long as the vertical members 9, 10 are part of the frame, it is only necessary to provide fastening means 70 on one of the frame elements, e.g. horizontal member 20. However, where the vertical members 9, 11 are omitted, each horizontal member 12, 14, 16, 18, and 20 is provided with means 76, 74, 72, and 70 for fastening the respective horizontal member to the room wall structure. With each row containing up to four articles 7, this particular embodiment can store up to thirty two articles 7 in that each storage level has only two superimposed rows.

The storage and display unit 5 can be formed of plastic or other conventional materials, e.g. wood, to suit a variety of tastes and accommodate a wide range of decor.

The disclosed embodiments are merely exemplary of the invention which can be embodied in various forms. Therefore, specific structural and functional details herein are not to be interpreted as limiting, but merely as a basis for teaching one skilled in the art to employ the present invention.

I claim:

1. A storage and display unit for organizing a plurality of articles, said articles having a substantially uniform height, a substantially uniform width and a substantially uniform thickness, said storage and display unit comprising:

a first horizontally extending member and a second horizontally extending member, each of said first and second horizontally extending members having a front side, a back side, a first end portion and a second end portion, said first and second horizontally extending members being positioned substantially parallel to each other and spaced apart by a distance greater than the height of said articles;

a first flange on said first horizontally extending member, said first flange extending from said first horizontally extending member toward said second horizontally extending member, said first flange being spaced from the back side of said first horizontally extending member by a distance greater than twice the thickness of one of said articles;

a second flange on said second horizontally extending member, said second flange extending from said second horizontally extending member toward said first horizontally extending member, said first and second flanges being positioned to define an opening therebetween through which said articles can be moved while inclined at an acute angle to said first and second flanges, said opening having a height which is less than the height of one of said articles, said opening having a width which is greater than twice the width of one of said articles, a first row of articles located between the back side of said first horizontally extending member and said first flange; and a second row of articles located between said first row of articles and said first flange, said articles of said first and second rows having a width greater than about ¼ an inch.

2. A storage and display unit in accordance with claim 1, further comprising:

a first vertical member fixedly secured between the first end portion of said first horizontally extending member and the first end portion of said second horizontally extending member; and a second vertical member fixedly secured between the second end portion of said first horizontally extending member and the second end portion of said second horizontally extending member, whereby said first and second vertical members define the width of said opening.

3. A storage and display unit in accordance with claim 2, further comprising:

a back panel fixedly secured to the back side of each of the first and second horizontally extending members, whereby said back panel cooperates with said first horizontally extending member, said second horizontally extending member and said vertical members to define a storage space for said articles to the rear of said first and second flanges.

4. A storage and display unit in accordance with claim 1, further comprising:

a third horizontally extending member positioned substantially in parallel with said first and second horizontally extending members with said second horizontally extending member being positioned between said first and third horizontally extending members, said second and third horizontally extending members being spaced apart by a distance greater than the height of one of said articles;

a third flange on said second horizontally extending member extending from said second horizontally extending member toward said third horizontally extending member, said third flange being spaced from the back side of said second horizontally extending member by a distance greater than twice the thickness of one of said articles;

a fourth flange on said third horizontally extending member extending from said third horizontally extending member toward said second horizontally extending member, said third and fourth flanges being positioned to define a second opening that removably receives said articles, said second opening having a height which is less than the height of one of said articles, said second opening having a width which is greater than twice the width of one of said articles.

5. A storage and display unit in accordance with claim 1, further comprising:

a first guide rail extending from said first horizontally extending member in the direction of said second horizontally extending member, said first guide rail running from said first end portion of said first horizontally extending member to said second end portion of said first horizontally extending member in a direction parallel with the back side of said first horizontally extending member, said first guide rail being spaced from said back side a distance greater than the thickness of one of said articles.

6. A storage and display unit in accordance with claim 5, further comprising:

a second guide rail extending from said second horizontally extending member in the direction of said third horizontally extending member, said second guide rail running from said first end portion to said second end portion of said second horizontally extending member in a direction parallel with the back side of said second horizontally extending member, said second guide rail being spaced between said first guide rail and said second flange a distance greater than the thickness of one of said articles to maintain a spacing between said second row of articles and said second flange.

7. A storage and display unit in accordance with claim 1, further comprising:

at least one fastener for mounting said storage and display unit on a wall.

8. A storage and display unit in accordance with claim 1, further comprising:

a first finger notch on said first horizontally extending member, said first finger notch extending from the front side to the back side of said first horizontally extending member, said first finger notch extending away from the top edge of said first horizontally extending member; and a second finger notch on said second horizontally extending member, said second finger notch extending from the front side to he back side of said second horizontally extending member, said second finger notch extending away from the bottom edge of said second horizontally extending member, said second finger notch being located across said first finger notch and cooperating with said first finger notch to provide for ease of removing said article.

9. A storage and display unit in accordance with claim 8, further comprising:

a first row of finger notches on said first horizontally extending member, said first row of finger notches extending away from said second horizontally extending member, said first row of finger notches having up to N notches spaced equidistant from each other; and a second row of finger notches on said second horizontally extending member, said second row of finger notches extending away from said first horizontally extending member, said second row of finger notches having up to N notches spaced equidistant from each other on said second horizontally extending member.

10. A storage and display unit in accordance with claim 1, further comprising:

a first row of articles located between the back side of said first horizontally extending member and said first flange;

a second row of articles located between said first row of articles and said first flange;

said first row of articles containing up to N articles, wherein N is the maximum integer represented by the ratio of the width of said opening to the width of one of said articles; and said second row of articles contain N−1 articles, creating a second opening in said second row such that an article from said first row can be moved into said second opening.

11. A storage and display unit for organizing a plurality of articles, said articles having a substantially uniform height, a substantially uniform width and a substantially uniform thickness, said storage and display unit comprising:

a first horizontally extending member, a second horizontally extending member and a third horizontally extending member, each of said first, second and third horizontally extending members having a front side, a back side, a first end portion and a second end portion, said first and second horizontally extending members being positioned substantially parallel to each other and spaced apart by a distance greater than the height of said articles, said third horizontally extending member positioned substantially in parallel with said first and second horizontally extending members with said second horizontally extending member being positioned between said first and third horizontally extending members, said second and third horizontally extending members being spaced apart by a distance greater than the height of one of said articles;

a first flange on said first horizontally extending member, said first flange extending from said first horizontally extending member toward said second horizontally extending member, said first flange being spaced from the back side of said first horizontally extending member by a distance greater than twice the thickness of one of said articles;

a second flange on said second horizontally extending member, said second flange extending from said second horizontally extending member toward said first horizontally extending member, said first and second flanges being positioned to define an opening therebetween through which said articles can be moved while inclined at an acute angle to said first and second flanges, said opening having a height which is less than the height of one of said articles, said opening having a width which is greater than twice the width of one of said articles; a first vertical member fixedly secured between the first end portion of said first horizontally extending member and the first end portion of said second horizontally extending member;

a second vertical member fixedly secured between the second end portion of said first horizontally extending member and the second end portion of said second horizontally extending member, whereby said first and second vertical members define the width of said opening; a back panel fixedly secured to the back side of each of the first and second horizontally extending members, whereby said back panel cooperates with said first horizontally extending member, said second horizontally extending member and said vertical members to define a storage space for said articles to the rear of said first and second flanges:

a third flange on said second horizontally extending member extending from said second horizontally extending member toward said third horizontally extending member, said third flange being spaced from the back side of said second horizontally extending member by a distance greater than twice the thickness of one of said articles;

a fourth flange on said third horizontally extending member extending from said third horizontally extending member toward said second horizontally extending member, said third and fourth flanges being positioned to define a second opening that removably receives said articles, said second opening having a height which is less than the height of one of said articles, said second opening having a width which is greater than twice the width of one of said articles;

a first guide rail extending from said first horizontally extending member in the direction of said second horizontally extending member, said first guide rail running from said first end portion of said first horizontally extending member to said second end portion of said first horizontally extending member in a direction parallel with the back side of said first horizontally extending member, said first guide rail being spaced from said back side a distance greater than the thickness of one of said articles;

a second guide rail extending from said second horizontally extending member in the direction of said third horizontally extending member, said second guide rail running from said first end portion to said second end portion of said second horizontally extending member in a direction parallel with the back side of said second horizontally extending member, said second guide rail being spaced between said first guide rail and said second flange a distance greater than the thickness of one of said articles to maintain a spacing between said second row of articles and said second flange;

a first finger notch on said first horizontally extending member, said first finger notch extending from the front side to the back side of said first horizontally extending member, said first finger notch extending away from the top edge of said first horizontally extending member;

a second finger notch on said second horizontally extending member, said second finger notch extending from the front side to he back side of said second horizontally extending member, said second finger notch extending away from the bottom edge of said second horizontally extending member, said second finger notch being located across said first finger notch and cooperating with said first finger notch to provide for ease of removing said article;

a first row of articles located between the back side of said first horizontally extending member and said first flange and a second row of articles located between said first row of articles and said first flange, said first row of articles containing up to N articles, wherein N is the maximum integer represented by the ratio of the width of said opening to the width of one of said articles; and said second row of articles contain N−1 articles, creating a second opening in said second row such that an article from said first row can be moved into said second opening; and at least one fastener for mounting said storage and display unit on a wall.

12. A storage and display unit for organizing a plurality of articles, said articles having a substantially uniform height, a substantially uniform width and a substantially uniform thickness, said article of manufacture comprising:

(a) a first member and a second member, each of said first and second members having a front side and a back side, said first member and second member having first end portions and second end portions, said first and second members being positioned substantially parallel to each other and spaced apart by a distance greater than the height of said articles;

(b) a first flange on said first member, said first flange extending from said first member in the direction of said second member, said first flange being spaced from the back side of said first member by a distance greater than three times the thickness of said articles;

(c) a first row of articles located between the back side and said first flange;

(d) a second row of articles located between said first row and (e) a third row of articles located between said second row and said first flange;

(f) a second flange on said second member, said second flange extending from said second member in the direction of said first member, said first and second flanges being positioned to define an opening therebetween through which said articles can be moved while inclined at an acute angle to said first and second flanges, said opening having a height which is less than the height of said articles, said opening having a width which is greater than three times the width of said articles.

13. A storage and display unit for organizing a plurality of articles as in claim 12, further comprising:

(a) a first vertical member fixedly secured between the first end portion of said first member and the first end portion of said second member;

(b) a second vertical member fixedly secured between the first end portion of said first member and the first end portion of said second member, whereby said first and second vertical members define the width of said opening.

14. A storage and display unit for organizing a plurality of articles as in claim 13, further comprising:

(a) a generally flat back panel fixedly secured to the back end of the first and second members, whereby said back panel cooperates with said first member, second member and vertical members to define a space to removably accept said articles.

15. A storage and display unit for organizing a plurality of articles as in claim 12, further comprising:

(a) a third member being positioned substantially in parallel with said first and second members with said second member being positioned between said first and third members, said second and third members being spaced apart by a distance greater than the height of said articles;

(b) a third flange on said second member extending from said second member in the direction of said third member, said third flange being spaced from the back side of said second member by a distance greater than twice the thickness of said articles;

(c) a fourth flange on said third member extending from said third member in the direction of said second member, said third and fourth flanges being positioned to define a second opening that removably receive said articles, said second opening having a height which less than the height of said articles, said second opening having a width which is greater than twice the width of said articles.

16. A storage and display unit for organizing a plurality of articles as in claim 12, further comprising:

(a) at least one guide rail extending from said first member in the direction of said second member, said first guide rail running from said first end portion to said second end portion of said first member in a direction parallel with the back side of said first member, said guide rail being spaced from said back side a distance greater than the thickness of one of said articles to maintain a spacing separating a plurality of rows of articles.

17. A storage and display unit for organizing a plurality of articles as in claim 12, further comprising:

(a) at least one fastener securing member adapted for mounting said back panel on a wall.

* * * * *